US012152770B2

(12) United States Patent
Gäbele

(10) Patent No.: US 12,152,770 B2
(45) Date of Patent: Nov. 26, 2024

(54) BACKLIT WALL COVERING FOR A SAUNA AND SAUNA WITH SUCH A BACKLIT WALL COVERING

(71) Applicant: Klafs GmbH, Schwäbisch Hall (DE)

(72) Inventor: Markus Gäbele, Schwäbisch Hall—Gailenkirchen (DE)

(73) Assignee: KLAFS GMBH, Schwäbisch Hall (DE)

( * ) Notice: Subject to any disclaimer, the term of this patent is extended or adjusted under 35 U.S.C. 154(b) by 0 days.

(21) Appl. No.: 18/368,268

(22) Filed: Sep. 14, 2023

(65) Prior Publication Data

US 2024/0110695 A1 Apr. 4, 2024

(30) Foreign Application Priority Data

Sep. 30, 2022 (DE) .......................... 20202210553.7

(51) Int. Cl.
*F21V 33/00* (2006.01)
*A61H 33/00* (2006.01)
*A61H 33/06* (2006.01)
*F21V 3/06* (2018.01)

(52) U.S. Cl.
CPC ......... *F21V 33/006* (2013.01); *A61H 33/067* (2013.01); *F21V 3/0625* (2018.02); *A61H 2033/0083* (2013.01)

(58) Field of Classification Search
CPC ........ A61H 2033/0083; A61H 2003/00; F21V 3/0625; F21V 33/00
See application file for complete search history.

(56) References Cited

U.S. PATENT DOCUMENTS

2009/0251917 A1* 10/2009 Wollner .................. B60Q 3/54 362/543

FOREIGN PATENT DOCUMENTS

EP 2168632 A2 * 3/2010 ........... A61F 7/0053

OTHER PUBLICATIONS

Innovation q+ npl search (Year: 2024).*

* cited by examiner

*Primary Examiner* — Anabel Ton
(74) *Attorney, Agent, or Firm* — Dickinson Wright PLLC; Steven C. Hurles

(57) ABSTRACT

The disclosure relates to backlit wall covering for a sauna with wood lamellae arranged spaced from one another and fastened to slats spaced from one another. A diffuser is adhesively bonded onto the rear sides of the wood lamellae.

19 Claims, 4 Drawing Sheets

BACKLIT WALL COVERING FOR A SAUNA AND SAUNA WITH SUCH A BACKLIT WALL COVERING

CROSS-REFERENCE TO RELATED APPLICATION

This application claims priority to and the benefit of German Patent Application No. 202022105537, filed on Sep. 30, 2022, and entitled "BACKLIT WALL COVERING FOR A SAUNA AND SAUNA WITH SUCH A BACKLIT WALL COVERING," which is herein incorporated by reference.

BACKGROUND

1. Field

The present disclosure relates to a backlit wall covering for a sauna and a sauna with such a backlit wall covering.

2. Related Art

In order to be able to be distinguished from competing products, there is a need for backlit wall covering in the field of saunas which creates particularly pleasant illumination for the user, can be manufactured efficiently and withstands the high temperature fluctuations as best as possible, so that the wall covering can be used in its original design for a long time.

SUMMARY

The object of the present disclosure is to specify such a backlit wall covering.

According to the present disclosure, a solution to the problem is given where the backlit wall covering for a sauna has wood lamellae arranged spaced from one another which are attached to slats arranged spaced from one another, where a diffuser is adhesively bonded onto the rear sides of the wood lamellae.

A diffuser is a light-scattering layer of material that can be made of various materials, such as paper, and is preferably flexible.

Very pleasant illumination can be obtained through the combination of wood lamellae and the diffuser. When using wood lamellae for wall covering for saunas, however, there is often the problem that they warp due to the strong temperature fluctuations and thereby disfigure the wall covering. The solution according to the disclosure with the diffuser adhesively bonded onto the rear sides of the wood lamellae gives the latter additional support, and warping of the wood lamellae can be prevented. In this way, the original design of the backlit wall covering is retained.

According to a preferred embodiment of the backlit wall covering according to the disclosure, a lighting for backlighting the wall covering is arranged behind the diffuser, preferably at the lower end of the wall covering. The lighting is preferably LED lighting, in particular from below, which creates backlighting of the wall covering that is pleasant to the user and energy-efficient.

More preferably, the lighting is configured such that the light color and/or the brightness of the lighting can be adjusted. As a result, the lighting can be adapted to the current wishes of the user, so that particularly pleasant illumination can be created. Preferably, the light color and brightness can be adjusted by a control device so that different light ceremonies can be created.

In a particularly preferred embodiment, the diffuser has a PET layer in addition to at least one light-scattering paper layer, where the PET layer is preferably arranged as a middle layer between two paper layers. The PET layer additionally strengthens the diffuser without significantly influencing its light-transmissivity. As a result, the effect of the adhesively bonded diffuser can be further improved with regard to avoiding any deformation of the wood lamellae in the event of temperature fluctuations.

The diffuser is preferably adhesively bonded with the paper layer in the direction towards the rear sides of the wood lamellae onto the latter. This improves the illumination created by the backlit wall covering.

According to a further embodiment, the diffuser is adhesively bonded to the rear sides of the wood lamellae using white adhesive mixed with hardener which remains stable at sauna temperatures. This can prevent the diffuser from detaching from the wood lamellae.

In a further preferred embodiment, the wood lamellae have a thickness of between 5 and 15 mm, preferably 10 mm.

In a preferred embodiment, the wood lamellae are arranged parallel to one another and spaced evenly from one another. This results in uniform illumination through the backlit wall covering.

In a particularly preferred embodiment, the wood lamellae are arranged horizontally and the slats are arranged vertically. This enables efficient construction and an attractive appearance.

In a further preferred embodiment, the wood lamellae form an angle with the vertical of between 30° and 70°, preferably an angle of 45°. This allows sufficient light to enter the interior of the sauna to enable attractive illumination.

In a particularly preferred embodiment, the wood lamellae are arranged one above the other such that, in a horizontal top view onto the wood lamellae, there is a spacing between the wood lamellae that are arranged directly one above the other, where this spacing is preferably between 3 and 15 mm. As a result, the diffuser is partially visible behind the wood lamellae, which creates a pleasant diffuse illumination.

In a further preferred embodiment, first ends of the wood lamellae are attached to a first profile rail and second ends of the wood lamellae to a second profile rail such that the wood lamellae arranged in parallel form a lamellae grid with the first profile rail and the second profile rail. The wood lamellae can also be attached to the profile rails, for example, using adhesive that is stable under heat. This simplifies the construction, and the wood lamellae can be attached to the slats by way of the profile rails.

The first profile rail is preferably configured as an I profile rail and the second profile rail as an L profile rail, and the backlit wall covering is formed from several lamellae grids such that a first lamellae grid is screwed at its I profile rail to one of the slats and a second lamellae grid is inserted with a leg of its L profile rail into a gap between the I profile rail of the first lamellae grid and the wood lamellae of the first lamellae grid attached thereto, so that the screw connection of the I profile rail of the first lamellae grid of the side of the wood lamellae facing away from the slat is covered by the leg of the L profile rail of the second lamellae grid. This further simplifies the construction of the backlit wall covering since the lamellae grids only have to be screwed to the slats on a profile rail. In addition, the screw connection can be covered and is no longer visible.

In a particularly preferred embodiment, the slats are spaced from one another by no more than one meter. This counteracts warping of the wood lamellae.

In a further preferred embodiment, the wood lamellae are made of hemlock wood or walnut wood, where the wood lamellae preferably have only vertical annual rings and Rift quality. These types of wood are particularly suitable for sauna wall covering. The use of wooden lamellae, which only have standing annual rings and Rift quality, can counteract warping of the wooden lamellae.

In a further preferred embodiment, only wood lamellae that have not shown any distortion during pre-tempering are part of the backlit wall covering. This can also ensure that warping of the wood lamellae of the backlit wall covering is minimized.

The present disclosure also provides a sauna with a backlit wall covering of the disclosure according to one of the embodiments previously described. As a result, the sauna provides advantageous illumination by way of the backlit wall covering.

According to a preferred embodiment of the sauna according to the disclosure, the slats are attached to the wall panels of the sauna such that an illumination space is formed between the wall panels and the wood lamellae in which the lighting is preferably arranged. The illumination space spreads the light evenly across the rear side of the diffuser, allowing for even illumination of the sauna. The lighting is preferably arranged on the floor of the illumination space.

The illumination space is advantageously lined along the wall panels with a reflective layer, preferably aluminum foil. This improves the light distribution across the backlit wall covering. At the same time, the reflective layer and the illumination space create additional insulation for the sauna.

According to a further preferred embodiment of the sauna according to the disclosure, all wall panels of the sauna that are not made of glass are clad with the backlit wall covering, where corners of the sauna are preferably clad with a wall covering made of curved wood lamellae.

According to a further preferred embodiment of the sauna according to the disclosure, reinforcements are arranged in the wall panels and support bunk receptacles, preferably made of steel, which protrude from the reinforcements through the wood lamellae and to which a sauna bunk is attached. This means that sauna bunks can be attached efficiently forward of the backlit wall covering.

BRIEF DESCRIPTION OF THE DRAWINGS

Embodiments of the disclosure shall be explained in more detail hereafter with reference to drawings, wherein.

DETAILED DESCRIPTION OF THE ENABLING EMBODIMENT

Figure 1:
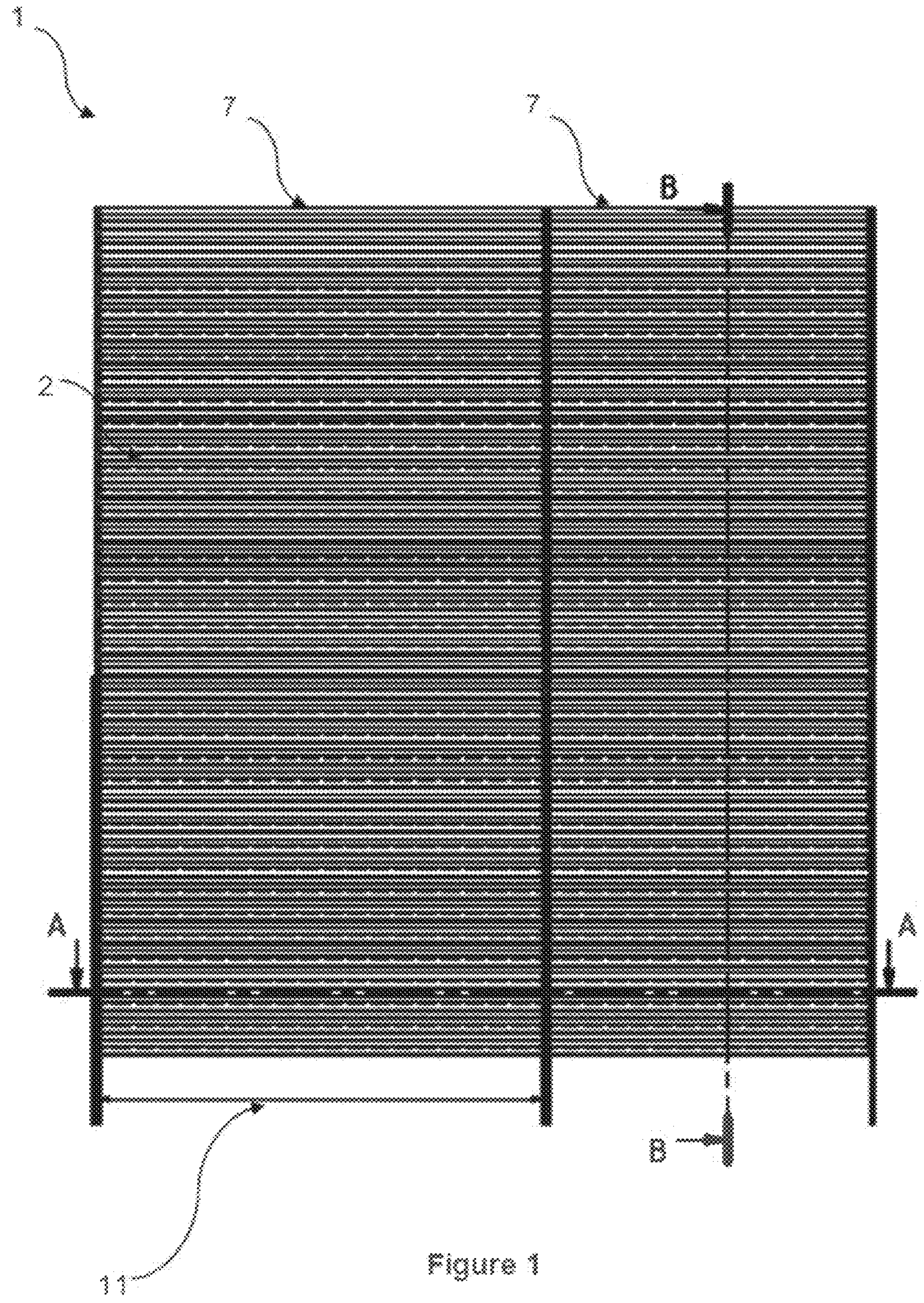
FIG. 1 shows a schematic front view of a first embodiment of the backlit wall covering according to the disclosure.

It applies to the following embodiments that like parts are designated by like reference characters. Where a figure contains reference characters which are not explained in more detail in the associated figure description, then reference is made to preceding or subsequent figure descriptions.

Figure 2:
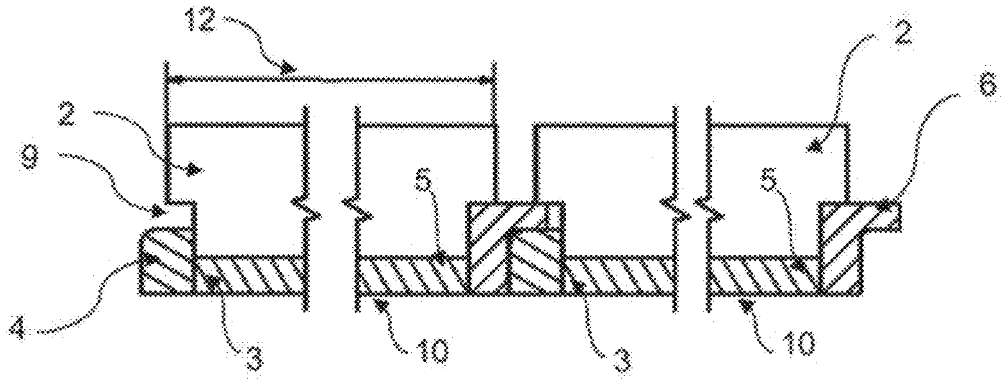
FIG. 2 shows a horizontal schematic sectional view through the first embodiment of the backlit wall covering according to the disclosure.
Figure 3:
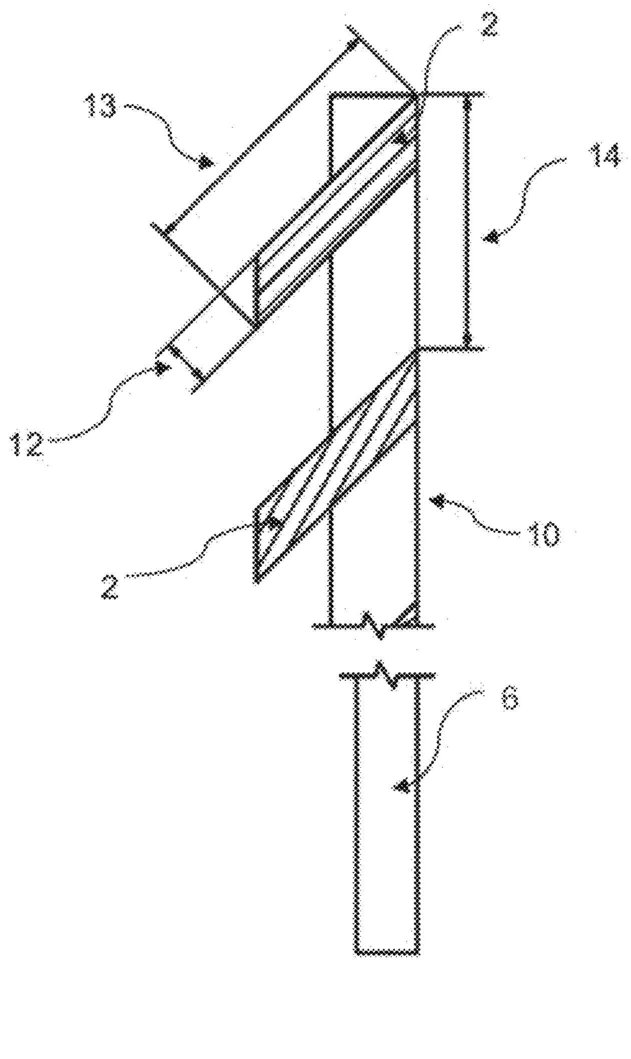
FIG. 3 shows a vertical schematic sectional view through the first embodiment of the backlit wall covering according to the disclosure.

FIG. 1 shows a schematic top view onto a first embodiment of a backlit wall covering 1 with wood lamellae 2 spaced parallel from one another and which arranged horizontally and have a uniform spacing from one another. FIGS. 2 and 3 show a horizontal (A-A) and vertical (B-B) sectional view of this schematic top view.

Wood lamellae 2 are connected at their first ends 3 to a vertically arranged I profile rail 4 and at their second ends 5 to an L profile rail 6. A diffuser 10 is adhesively bonded to the rear sides of wood lamellae 2 between I profile rail 4 and L profile rail 6. An I profile rail 4, an L profile rail 6, wood lamellae 2 disposed there between form a lamellae grid 7. The backlit wall covering shown in FIG. 1 there has two lamellae grids 7. Lamellae grids 7 are attached to vertical slats 8, where I profile rail 4 of lamellae grid 7 is screwed to vertical slat 8, and L profile rail 6 of another lamellae grid 7 is inserted into a gap 9 between I profile rail 4 and wood lamellae 2 and covers the screw connection there. This arrangement is shown in particular in FIG. 2.

Spacing 11 between I profile rail 4 and the L profile rail 6 and therefore also between slats 8 to which lamellae grid 7 is attached is preferably no greater than 1 meter. In the first embodiment of backlit wall covering 1 shown in FIGS. 1 to 3, wood lamellae 2 have a thickness 12 of 10 mm, a width 13 of 55 mm and an angle to the vertical of 45°. Vertical spacing 14 between wood slats 2 arranged directly one above the other is 50 mm in the embodiment shown.

Figure 4:
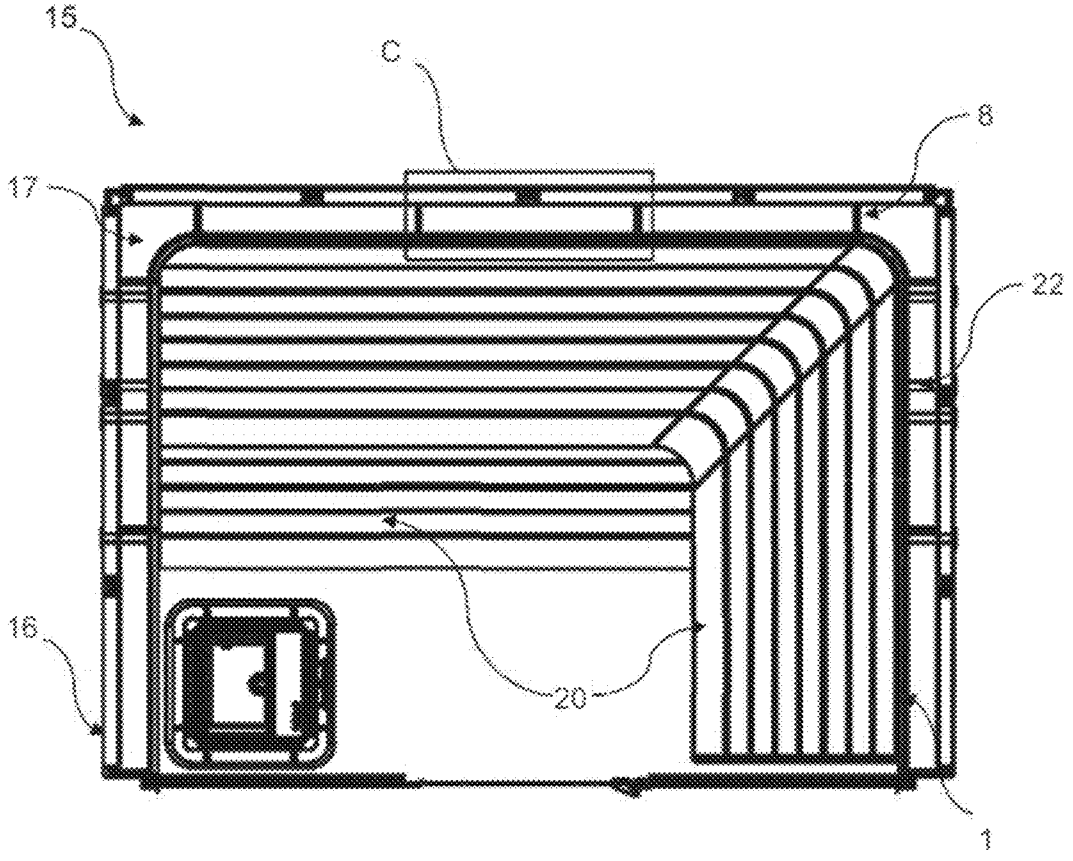
FIG. 4 shows a top view from above onto a first embodiment of the sauna according to the disclosure.
Figure 5:
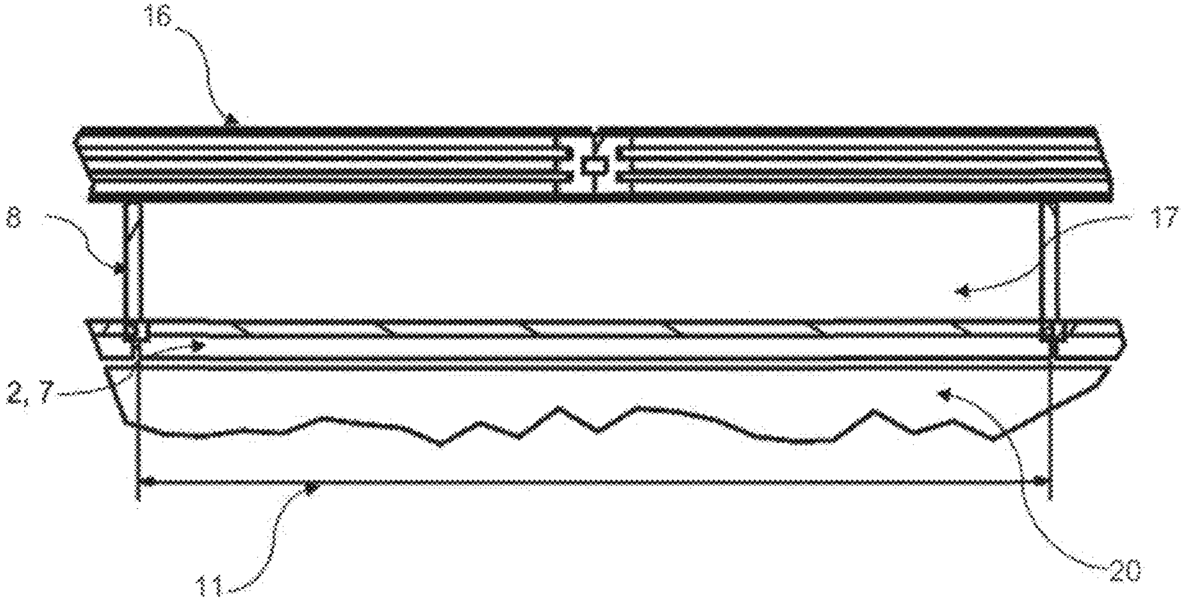
FIG. 5 shows a detailed view of a top view onto a first embodiment of the sauna according to the disclosure.

FIG. 4 shows a top view onto an embodiment of a sauna 15 according to the disclosure with a wall covering 1 according to the disclosure and FIG. 5 shows a detailed view C of the top view onto the embodiment of sauna 15 according to the disclosure. In sauna 15, several lamellae grids 7 are attached to wall panels 16 by way of slats 8, where wooden lamellae 2 of lamellae grids 7' are curved in the rear corners of sauna 15 so that the corners are also covered by the wall covering.

Figure 6:
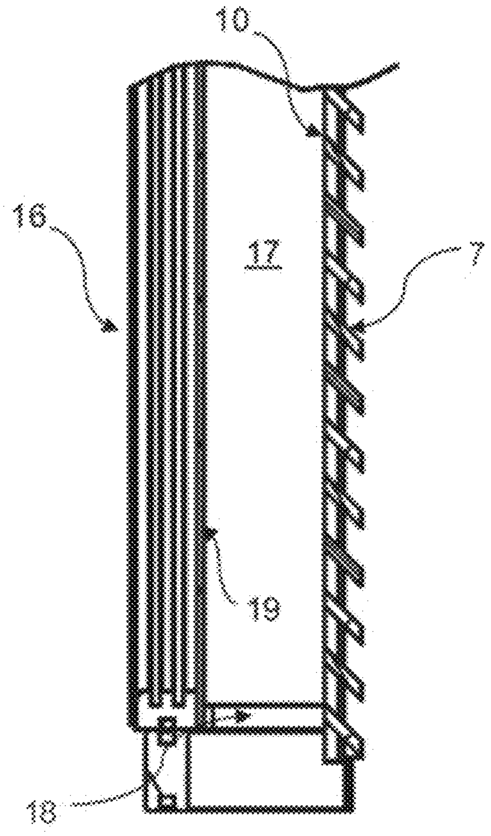
FIG. 6 shows a detailed view of the side wall with the backlit wall covering of the sauna according to the disclosure at the level of the floor of the sauna.

FIG. 6 shows a detailed view of the side wall of sauna 15 with backlit wall covering 1 at the level of the floor of sauna 15. Wall covering 1 and wall panels 16 form an illumination space 17. Arranged on the floor of this illumination space 17 is lighting 18 which illuminates illumination space 17 and thereby backlights wall covering 1. In order to improve the backlighting, an aluminum foil 19 is arranged on wall panels 16 of sauna 15 in illumination space 17.

Figure 7:
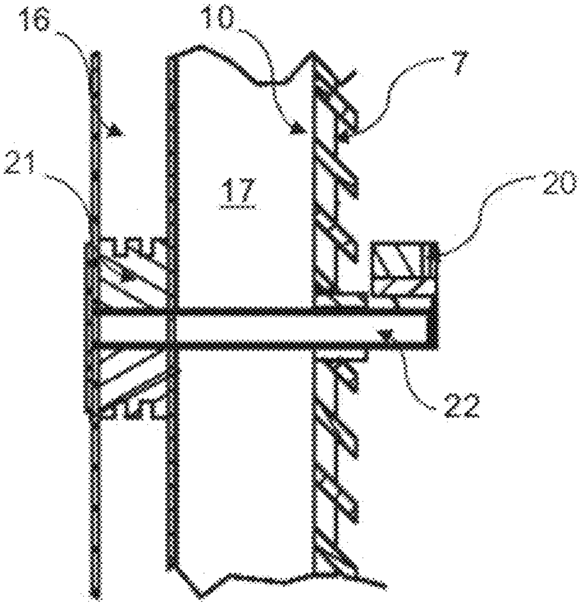
FIG. 7 shows a detailed view of the side wall with the backlit wall covering of the sauna according to the disclosure at the level of the bunk of the sauna.

In addition, sauna 15 has several sauna bunks 20. In order to anchor them to wall panels 16 of sauna 15, reinforcements 21 are arranged in wall panels 16 and support bunk receptacles 22 made of steel which protrude through wood lamellae 2 of wall covering 1. Sauna bunks 20 can then be attached to these bunk receptacles 22. This is shown in FIG. 7 in the detailed view of the side wall with backlit wall covering 1 of sauna 15 according to the disclosure at the level of a sauna bunk 19 of sauna 15.

What is claimed is:

1. A sauna, comprising:

a sauna including a backlit wall and a backlit wall covering, said backlit wall covering comprising;

a plurality of wood lamellae arranged spaced from one another and fastened to slats, the wood lamellae having rear sides, a diffuser that is adhesively bonded onto the rear sides of said wood lamellae, and a lighting arranged behind said diffuser for backlighting said wall covering.

2. The sauna according to claim 1, wherein said lighting is arranged at the lower end of said wall covering.

3. The sauna according to claim 2, wherein said lighting is configured such that the light color and/or the brightness of said lighting can be adjusted.

4. The sauna according to claim 1, wherein said diffuser has a PET layer in addition to at least one light-scattering paper layer, and wherein said PET layer is arranged as a middle layer between two paper layers.

5. The sauna according to claim 4, wherein said diffuser is adhesively bonded with said paper layer in the direction towards the rear sides to said wood lamellae onto the latter.

6. The sauna according to claim 1, wherein said diffuser is adhesively bonded to the rear sides of said wood lamellae using white adhesive mixed with hardener which remains stable at sauna temperatures.

7. The sauna according claim 1, wherein said wood lamellae have a thickness between 5 and 15 mm.

8. The sauna according to claim 1, wherein said wood lamellae are arranged parallel to one another and spaced evenly from one another.

9. The sauna according to claim 1, wherein said wood lamellae are arranged horizontally and said slats are arranged vertically.

10. The sauna according to claim 9, wherein said wood lamellae form an angle with the vertical between 30° and 70°.

11. The sauna according to claim 10, wherein said wood lamellae are arranged one above the other such that, in a horizontal top view onto said wood lamellae, there is a spacing between said wood lamellae that are arranged directly one above the other, and wherein this spacing is between 3 and 15 mm.

12. The sauna according to claim 1, wherein first ends of said wood lamellae are attached to a first profile rail and second ends of said wood lamellae are attached to a second profile rail such that said wood lamellae are arranged in parallel and form a lamellae grid with said first profile rail and said second profile rail.

13. The sauna according to claim 1, wherein said first profile rail is configured as an I profile rail and said second profile rail as an L profile rail, and said backlit wall covering is formed from several lamellae grids such that a first lamellae grid is screwed at its I profile rail to one of said slats and a second lamellae grid is inserted with a leg of its L profile rail into a gap between said I profile rail of said first lamellae grid and said wood lamellae of said first lamellae grid attached thereto, so that the screw connection of said I profile rail of said first lamellae grid of the side of said wood lamellae facing away from said slat is covered by the leg of said L profile rail of said second lamellae grid.

14. The sauna according to claim 1, wherein said the slats are spaced from one another by no more than one meter.

15. The sauna according to claim 1, wherein said wood lamellae are made of hemlock wood or walnut wood, where said wood lamellae have only standing annual rings and Rift quality.

16. The sauna according to claim 1, wherein said slats are attached to wall panels of said sauna such that an illumination space is formed between said wall panels and said wood lamellae in which said lighting is arranged.

17. The sauna according to claim 16, wherein said illumination space is lined along said wall panels with a reflective layer made of an aluminum foil.

18. The sauna according to claim 1, wherein all wall panels of said sauna that are not made of glass are clad with said backlit wall covering, where corners of said sauna are clad with a wall covering made of curved wood lamellae.

19. The sauna according to claim 1, wherein reinforcements are arranged in said wall panels and support bunk receptacles made of steel, which protrude from said reinforcements through said wood lamellae and to which a sauna bunk is attached.

* * * * *